UNITED STATES PATENT OFFICE.

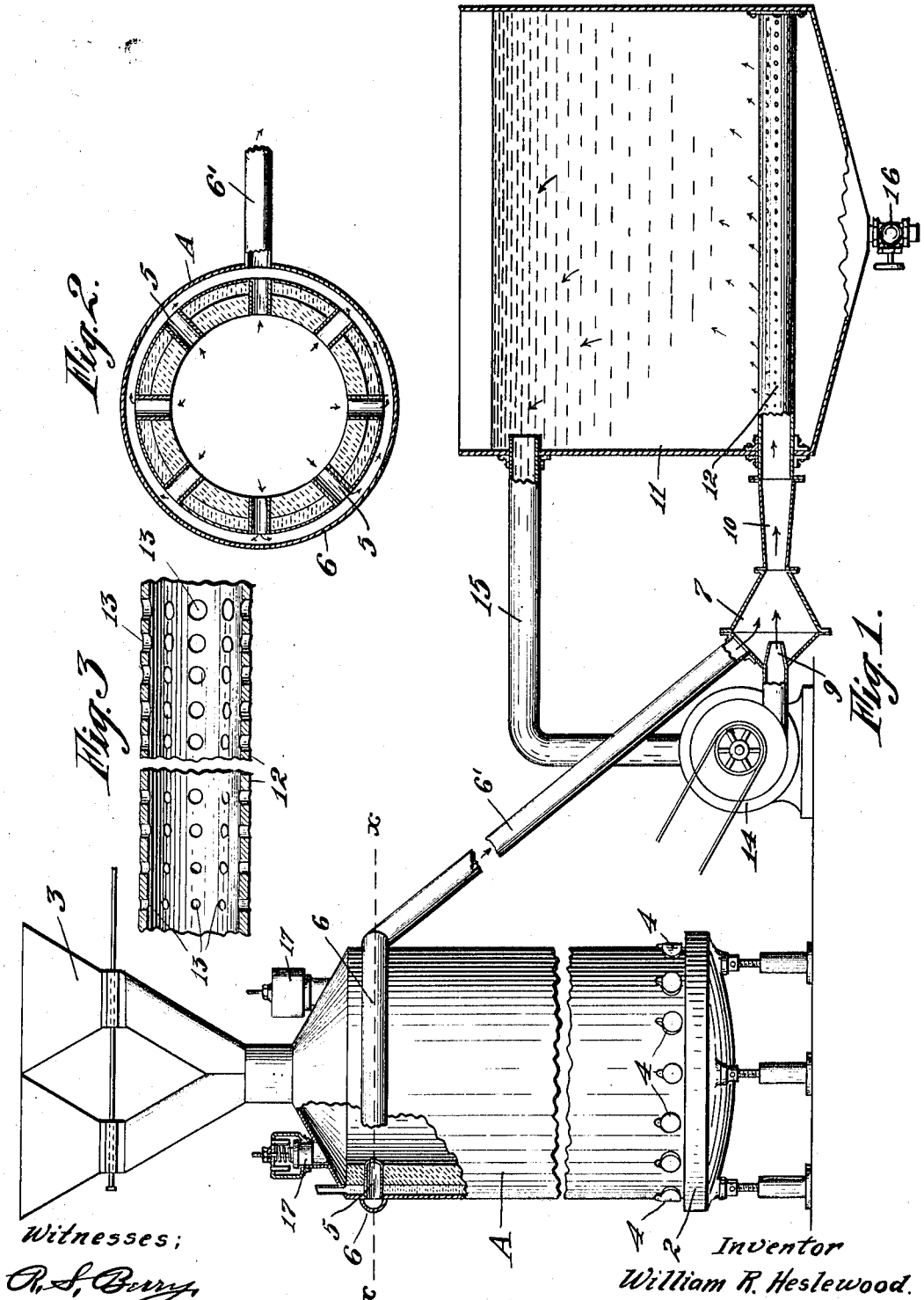

WILLIAM R. HESLEWOOD, OF BERKELEY, CALIFORNIA, ASSIGNOR, BY DIRECT AND MESNE ASSIGNMENTS, TO SOUTH FORK SMELTING COMPANY, OF OAKLAND, CALIFORNIA, A CORPORATION OF CALIFORNIA.

FUME-CONDENSING APPARATUS.

980,257.     Specification of Letters Patent.     Patented Jan. 3, 1911.

Application filed February 28, 1910. Serial No. 546,498.

*To all whom it may concern:*

Be it known that I, WILLIAM R. HESLEWOOD, citizen of the United States, residing at Berkeley, in the county of Alameda and State of California, have invented new and useful Improvements in Fume-Condensing Apparatus, of which the following is a specification.

This invention relates to an apparatus for condensing fumes and particularly pertains to the water type of fume condenser.

It is the object of this invention to provide a fume condensing apparatus in which the fumes and gases generated in smelting furnaces are forced through a volume of water, and by means of which the volatile materials will be precipitated and condensed for further treatment.

A further object is to provide means for drawing the fumes through the water volume and means for breaking the current of gases so as to cause them to pass through the water in small bubbles or globules so as to bring them in intimate contact with the water, and thus facilitate condensation.

Another object is to provide means for maintaining a continuous circulation of the water and thereby aid the condensing process.

The invention consists of the parts and the construction and combinations of parts as hereinafter more fully described and claimed, having reference to the accompanying drawings, in which—

Figure 1 is a side view of the invention partly in section. Fig. 2 is a section on the line $x$, $x$, Fig. 1. Fig. 3 is a section of the perforated pipe on an enlarged scale showing the graduated perforations.

In the drawings A represents a furnace or kiln which may be of any suitable type and construction, and is here shown as a smelting furnace of the cupola type, having a hearth 2 at its lower end and charging hoppers or gallery 3 at its upper end. A series of dampered orifices or air inlets 4 are disposed at intervals around the furnace A a little above the hearth 2.

A series of vents 5 are provided in the upper end of the furnace A, which open into an outside surrounding trunk 6, having a suction pipe construction 6′ through which the fumes and gases generated in the furnace A may be drawn, as later described. The suction pipe 6′ leads to any suitable point and terminates in a case or suction chamber 7, which is constructed as shown in Fig. 3, and consists of two bell-shaped or opposed conical sections which are bolted together at their mouths. A nozzle 9 projects axially into the case 7 and discharges into the contracted throat 10, which latter has a flared imperforate extension projecting into a tank 11 and terminating within the tank in a perforated section 12. The pipe 12 is horizontally disposed and extends across the water containing tank or condensing reservoir 11 at a point a little above the bottom of the latter.

The perforations 13 in the pipe 12 are graduated in size, as shown in Fig. 3, those nearest the throat 10 being about $\frac{1}{4}''$ in diameter, and those at the opposite end of the pipe being nearly $1''$ in diameter, the object of which will become apparent hereinafter.

The nozzle 9 is connected with a centrifugal pump 14, which has its inlet connected to a circulating pipe 15 leading to the upper portion of the tank or reservoir 12, and terminating beneath the surface of the water therein.

In practice the pump 14 is operated from any suitable source of power and acts to draw a volume of water from the tank 12 and force it at high pressure and great velocity through the nozzle 9. The rapidly moving jet is directed by the nozzle 9 across the chamber 7, and entering the throat 10 passes into the pipe 12. This action tends to create a vacuum in the chamber 7, and thus causes a suction to take place therein so as to draw a continuous current of gases and fumes, previously generated in the furnace A, through the suction pipe 6′, the gases entering the pipe 6′ through the vents 5.

The gases and fumes on entering the chamber 7 are carried forward by the stream of water emerging from the nozzle 9 and are drawn or forced into the pipe 12, from whence they pass through the perforations 13 into the tank 11. The perforations 13 being graduated in size, as above described, insures the gases and fumes being distributed throughout the length of the pipe 12 before passing into the tank, thus cooling and condensing the gases and fumes and breaking their current and causing those which remain uncondensed to enter the tank 11 and rise in the water therein in numerous small bubbles. The graduated perforations 13 also conduce to an equitable distribution of the gases over the whole length of the bottom of the tank 11, with the result that all the gases and fumes are not liberated into the tank at one spot, since in such an event the gases would move up as a solid volume through the water and little or no condensation or scrubbing would result. In this manner the fumes become thoroughly subjected to the condensing and scouring action of the water in the tank 12, so that the volatile or condensible matters, vapors and substances therein will become precipitated and settle to the bottom of the tank from whence they are removed for further treatment in any suitable manner, as through the trap 16. The agitation of the water in the tank A, due to its constant circulation through the pump 14, also aids the condensing action, besides rendering the apparatus continuous and economical in the use of water.

Relief valves 17 are suitably disposed in the head of the furnace A so as to permit of the escape of such gases as might accumulate in the furnace A in the event the suction apparatus should get out of order.

Having thus described my invention, what I claim and desire to secure by Letters-Patent, is:

1. In a fume condensing apparatus, the combination of a tank, a horizontally arranged pipe therein, said pipe having perforations of different diameters from one end to the other, a hydraulic ejector connected with one end of said pipe, a fume conduit connected with the ejector, said ejector comprising a casing formed of two bell-shaped or conical sections having their wider ends abutting, a restricted throat forming a discharge continuation of one of said sections, a nozzle extending into the smaller end of one of the sections and in line with the throat, a pump connected with the nozzle, and a supply pipe for the pump connected with the tank.

2. A fume condensing apparatus having in combination a tank, a horizontally arranged pipe therein, said pipe having perforations of different diameters from one end to the other, a hydraulic ejector connected with one end of said pipe, a fume conduit connected with the ejector, said ejector comprising a casing formed of two separable bell-shaped or conical sections bolted together with their wider ends abutting, a restricted throat forming a discharge continuation of one of said sections, a nozzle extending into the smaller end of one of the sections and in line with said throat, a centrifugal pump connected with the nozzle, and a supply pipe for the pump connected with the upper portion of the tank whereby a continuous circulation may take place through the tank and ejector and said perforated pipe.

In testimony whereof I have hereunto set my hand in the presence of two subscribing witnesses.

WILLIAM R. HESLEWOOD.

Witnesses:
RAYMOND A. LEONARD,
CHARLES EDELMAN.